E. CHAPMAN.
Grain Binder.
No. 197,016. Patented Nov. 13, 1877.
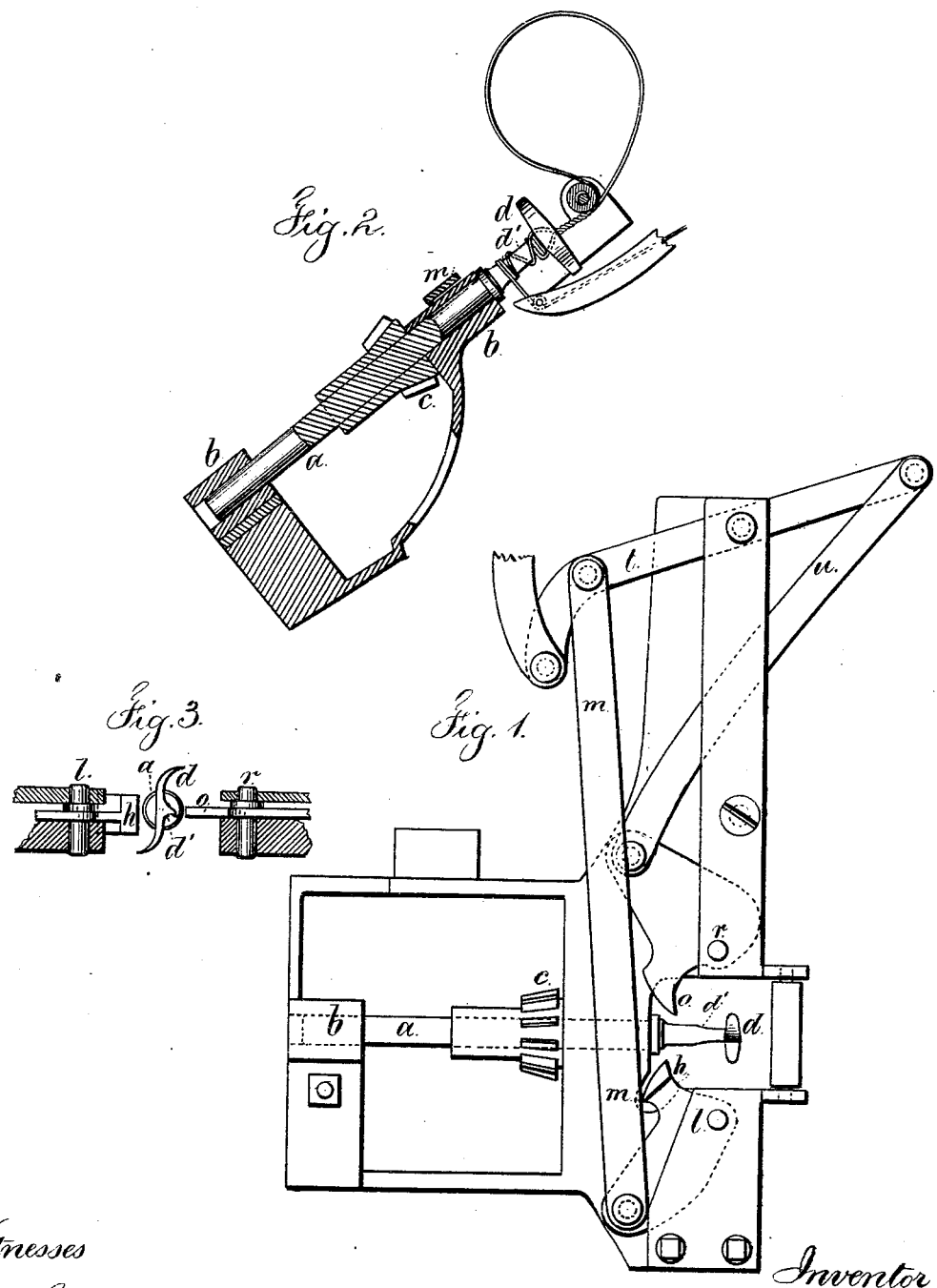

UNITED STATES PATENT OFFICE.

EDWIN CHAPMAN, OF ROCHESTER, MINNESOTA, ASSIGNOR TO CHAPMAN BINDER COMPANY, OF SAME PLACE.

IMPROVEMENT IN GRAIN-BINDERS.

Specification forming part of Letters Patent No. 197,016, dated November 13, 1877; application filed October 1, 1877.

*To all whom it may concern:*

Be it known that I, EDWIN CHAPMAN, of Rochester, in the State of Minnesota, have invented an Improvement in Wire Twisting and Cutting Mechanism for Grain-Binders, of which the following is a specification:

In grain-binders the wire has been passed around the bundle, and the ends twisted together.

In Letters Patent Nos. 184,505 and 192,150 devices are set forth for carrying the wire around the bundle, twisting the same, and cutting off the wire, and a reference is hereby made to these patents in order that the other devices employed with my present improvements may be fully understood.

My present invention is an improvement upon the cutting device, and the same is used in connection with a wire-twister similar to that shown in my aforesaid Patent No. 184,505. I make use of a swinging cutter that acts against the inner surface of the T-head to separate the coils of wire, and I also use a swinging hook to support the twister against the action of the cutter and to remove the loose pieces of cut wire from the shank of the twister.

In the drawings, Figure 1 is a plan of the present improvement. Fig. 2 is a longitudinal section of the same, and Fig. 3 is a view endwise of the twister-shaft.

The shaft $a$ is supported in bearings $b$ $b$, and upon it is the pinion $c$ that receives rotation, at the proper time, from a gear-wheel, actuated by a cam upon a large stop-motion wheel or otherwise, as in my former patents. At the end of this shaft $a$ is the wire-twister $d$, having a cross or T head and a tapering shank, $d'$. A coil at the end of the wire remains around the shank next the T-head, and the wire is passed around the bundle of grain and laid in the path of the revolving twister $d$, which, when it is rotated, catches the wire and twists the two parts together between the hook and the bundle, and also winds the wire around the larger part of the shank of the twister, nearer to the pinion, so that when the cutter is operated to separate the wire from the hook there will be a coil around the shank of the twister to hold what would otherwise be the loose end of the wire.

My present improvement relates to a swinging cutter, $h$, upon the fulcrum $l$, that is sustained by the frame of the mechanism at right angles, or nearly so, to the axis of the twister, and is actuated by the link $m$ that is jointed to the lever-tail of the cutter, so that, when said link $m$ is actuated by the mechanism of the binder, the cutter $h$ will be swung toward the shank and T-head of the cutter, and passing down adjacent to the shank, and press the previous end coil of wire toward the T-head, leaving the coil just made upon the larger part of the shank.

The portions of the T-head adjacent to the shank are made as cutting-edges, so that the cutter $h$ passing down against such edges separates the wire, cutting one side of the coils entirely off, and the portions of the coils that remain around the shank are loose, and may easily fall away, but to insure their removal, and to support the shank against the action of the cutter, I make use of the swinging hook $o$ upon the center $r$, which hook is moved toward the T-head of the twister slightly after the cutter, so as to support the shank $d'$ at the opposite side of the cutter $h$, and the hook in its further movement carries with it the remaining pieces of the coil of wire, separating them entirely from the shank of the T-headed twister.

The lever $t$ and link $u$ serve to connect the hook $o$ with the link $m$ that actuates the cutter, and cause the parts to move in harmony. I, however, remark that the cutter and hook may be actuated by any suitable mechanism.

I claim as my invention—

1. In a grain-binding machine the twister $d$, having a T-head and cutting-edges upon such head adjacent to the shank, in combination with the swinging cutter $h$ that separates the coil against the cutting-edges of the head, substantially as set forth.

2. In combination with the twister having a tapering shank, T-head, and cutting-edges, the swinging cutter $h$ and swinging hook $o$, substantially as set forth.

Signed by me this 15th day of September, A. D. 1877.

EDWIN CHAPMAN.

Witnesses:
THOS. H. MCCONNELL,
C. H. CHADBOURN.